United States Patent [19]
Takemura et al.

[11] Patent Number: 5,411,336
[45] Date of Patent: May 2, 1995

[54] ROLING BEARING

[75] Inventors: Hiromichi Takemura; Yasuo Murakami, both of Kanagawa, Japan

[73] Assignee: NSK Ltd., Tokyo, Japan

[21] Appl. No.: 99,549

[22] Filed: Jul. 30, 1993

[30] Foreign Application Priority Data

Jul. 30, 1992 [JP] Japan .................. 4-203920

[51] Int. Cl.$^6$ .............................. F16C 33/58
[52] U.S. Cl. .................... 384/492; 384/565
[58] Field of Search ............... 384/450, 490, 492, 548, 384/565, 569, 625

[56] References Cited

U.S. PATENT DOCUMENTS

| | | | |
|---|---|---|---|
| 5,064,298 | 11/1991 | Hibi et al. ................... | 384/492 X |
| 5,145,267 | 9/1992 | Takata et al. ................ | 384/565 X |

FOREIGN PATENT DOCUMENTS

| | | | |
|---|---|---|---|
| 24818 | 2/1986 | Japan ................... | 384/565 |
| 167715 | 7/1986 | Japan ................... | 384/492 |
| 1030008 | 6/1989 | Japan . | |
| 2-168021 | 6/1990 | Japan ................... | 384/565 |
| 3117724 | 5/1991 | Japan . | |
| 3117725 | 5/1991 | Japan . | |
| 172614 | 7/1991 | Japan ................... | 384/565 |
| 4-039412 | 2/1992 | Japan ................... | 384/569 |
| 2219359 | 2/1989 | United Kingdom . | |

*Primary Examiner*—Thomas R. Hannon
*Attorney, Agent, or Firm*—Sughrue, Mion, Zinn, Macpeak & Seas

[57] ABSTRACT

A rolling bearing long in service life in which the rolling contact surfaces of the rolling elements and the mating member thereof are prevented from peeling damage. In a rolling bearing used in boundary lubrication state, the surface roughnesses of the rolling contact surfaces of each of the rolling elements and the mating member thereof are in a range of from 0.15 to 0.5 $\mu$mRa when represented by central line average roughness, and the ratio thereof is 3 or smaller, whereby the surface roughnesses can be obtained in combination which are most suitable for decreasing the probabilities of the surface damage being caused in the surface layers of the rolling contact surfaces of the mating member and each rolling element. Hence, stresses are locally set up in the surface layers of the rolling contact surfaces which are smaller than the allowable shearing stress, so that the rolling contact surfaces are prevented from the peeling damage.

4 Claims, 3 Drawing Sheets

ROLING BEARING

BACKGROUND OF THE INVENTION

1. Field of the Industrial Application

This invention relates to a rolling bearing which is used in boundary lubrication state, being long in service life.

2. Description of the Prior Art

An oil film parameter $\Lambda$ is employed as an index concerning the service life of a rolling bearing. The parameter $\Lambda$ represents the degree of formation of an oil film which greatly affects the lubrication of the rolling bearing (cf. "Rolling Bearing Engineering" edited by Rolling Bearing Engineering Editing Committee, and published by Yokendo, Jul. 10, 1975, first edition). The parameter $\Lambda$ is represented by the following equation:

$$\Lambda = h\text{min}/\sqrt{(hr_1^2 + hr_2^2)}$$

where hmin=minimum oil film thickness $hr_1$ and $hr_2$=square average roughnesses of two contact surfaces (the rolling contact surface of a bearing ring and rolling elements)

As is apparent from the above-described equation, as the value of the parameter $\Lambda$ increases, the oil film thickness is increased, and accordingly the life of the rolling bearing is increased. However, it should be noted that when $\Lambda \leq 1.5$, the rolling bearing is placed in so-called "boundary lubrication state", and its service life is decreased.

Hence, it has been considered that, in order to increase the service life of a rolling bearing, it is essential to machine the rolling contact surfaces of each of the rolling elements and the bearing ring as smooth as possible and to sufficiently form oil films in the rolling bearing.

However, to do so is rather difficult depending on the structure of the rolling bearing. For instance in the case where a needle roller bearing is used in such a manner that the inner race is omitted, and instead the shaft is used as a bearing surface, it is considerably difficult to machine the bearing surface accurately until its surface roughness becomes substantially equal to that of the needle rollers. Therefore, if such a rolling bearing is used under operating conditions that the two contact surfaces are liable to be directly brought into contact with each other, then the rough surface of the shaft is brought in contact with the smooth surfaces of the needle rollers, as a result of which the needle rollers are slightly peeled; that is, they suffer from so-called "peeling damage".

In order to eliminate the above-described difficulty, peeling damage, Japanese Patent Application Publication No. 30008/1989 has proposed the following method: That is, in the method, the surface roughness of the rolling surfaces of rolling elements rolling on a shaft having a rough surface is in a range of 0.3 to 1.5 $\mu$mRmax represented by maximum height, and a residual stress layer of 500 MPa or more is formed in the surface layer of each rolling element.

The machining conditions provided by the method are for the rolling elements only; that is, the method does not take into consideration the relationships between the surface roughness of the shaft, on which the rolling elements roll, and the surface roughness of the rolling elements. Hence, in the case of a rolling bearing in which the surface roughness of the rolling elements in combination with the surface roughness of the shaft does not satisfy certain conditions, the method is not so effective in preventing the rolling elements from the peeling damage.

SUMMARY OF THE INVENTION

In view of the foregoing, an object of this invention is to provide a rolling bearing long in service life which is formed according to a method in which the surface roughnesses of the rolling elements and the mating member and the ratio of those surface roughnesses are specified in a range of surface roughnesses which is obtained by subjecting the rolling elements and the mating member to ordinary grinding and polishing.

The foregoing object of the invention has been achieved by the provision of a rolling bearing which is used under a condition that the lubrication thereof is of an oil film parameter $\Lambda$ of 1.5 or smaller, in which the surface roughnesses $\sigma_2$ and $\sigma_1$ of the rolling contact surfaces of each rolling element and its mating member are in a range of from 0.15 to 0.5 $\mu$mRa when represented by central line average roughness according to JIS B0601, and the ratio $\sigma_1/\sigma_2$ or $\sigma_2/\sigma_1$ is 3 or less.

In the invention, the surface roughness $\sigma_1$ of the mating member should be less than three times the surface roughness $\sigma_2$ of the rolling element, or vice versa; and, the relationship in magnitude between the surface roughness $\sigma_1$ and $\sigma_2$ is not in question. This includes the case where the surface roughness $\sigma_1$ is equal to the surface roughness $\sigma_2$. However, preferably, in the case where $\sigma_1$ is 0.45 $\mu$mRa, $\sigma_2$ is a value in a range of 0.15 to 0.45 $\mu$mRa.

BRIEF DESCRIPTION OF THE DRAWING(S)

DETAILED DESCRIPTION OF THE PREFERRED EMBODIMENTS

Figure 1:
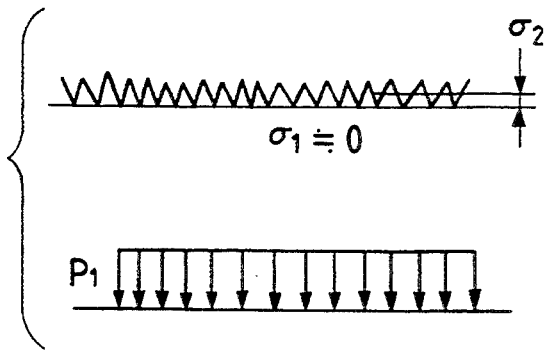
FIG. 1 is a diagram showing stresses induced when the ratio of the surface roughnesses of two surfaces which are in rolling contact with each other is larger than 3.
Figure 2:
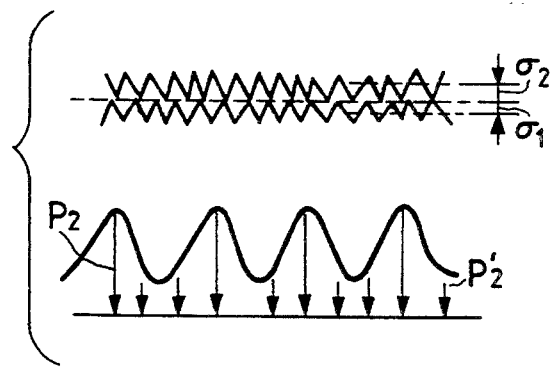
FIG. 2 is a diagram showing stresses induced when the ratio is equal to 3 or smaller.
Figure 3:
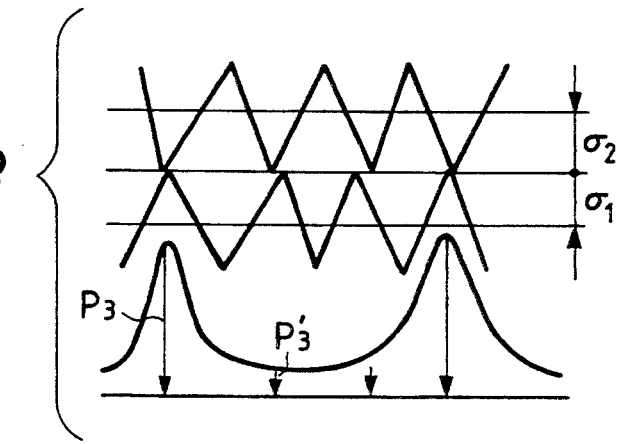
FIG. 3 is a diagram showing stresses established when the ratio is substantially one (1) and the two surfaces are larger than 0.5 $\mu$mRa in surface roughness.
Figure 4:
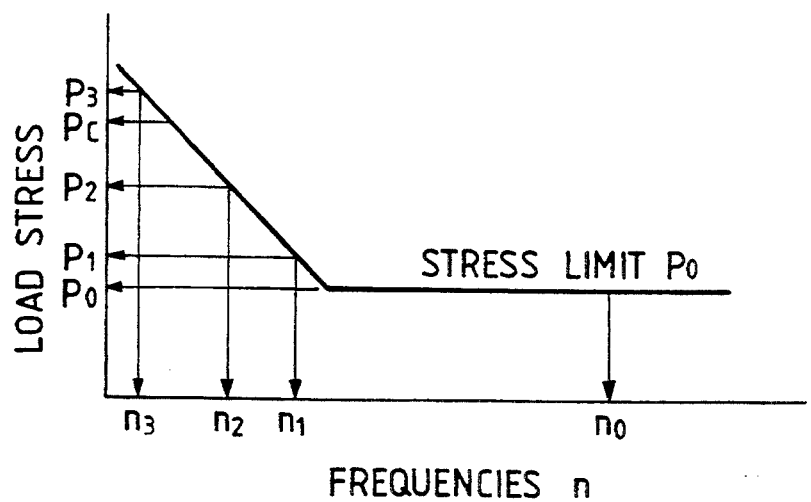
FIG. 4 is a diagram showing the relationships between a stress set up in a rolling contact surface (smooth surface) and the frequency thereof.

In using the rolling bearing in boundary lubrication state, the relationships between a stress set up in the contact surface of the mating member and surface damage given thereto are as shown in FIGS. 1 through 3 depending on the combinations of the surface roughnesses $\sigma_1$ and $\sigma_2$. The stress thus set up relates to its frequency as shown in FIG. 4.

FIG. 1 shows the case where $\sigma_2 >> \sigma_1$ ($\sigma_2/\sigma_1 > 3$). The protrusions of the rolling element's surface ($\sigma_2$ surface) are in contact with the mating member's surface ($\sigma_1$ surface) through a small contact ellipse, and a stress P is induced in the entire $\sigma_1$ surface near it (where is much shallower than the position of the maximum shearing stress). In the case of FIG. 3, $\sigma_1 \approx \sigma_2$, and both $\sigma_1$ and $\sigma_2$ are large ($\sigma_1$, $\sigma_2 > 0.5$ μmRa). In this case, a stress $P_3$ larger than the allowable shearing stress Pc is locally established in the $\sigma_1$ surface.

In the case of FIG. 2, the magnitudes of $\sigma_1$ and $\sigma_2$ and the ratio thereof are set as defined by the invention. In this case, a stress $P_2$ smaller than the allowable shearing stress Pc is locally set up; that is, the stress $P_2$ is not induced in the whole of the $\sigma_1$ surface.

The relation between the above-described stress and frequency and the probability of the surface damage being caused can be represented by the following expression (1):

$$(P_1 n_1)^a A_1{}^b \approx (P_3 n_3)^a A_3{}^b > (P_2 n_2)^a A_2{}^b > (P_0 n_0)^a A_0{}^b \quad (1)$$

where $P_0$, $P_1$, $P_2$ and $P_3$ are the stresses established, $n_0$, $n_1$, $n_2$ and $n_3$ are the frequencies, $A_0$, $A_1$, $A_2$ and $A_3$ are the probabilities of the surface damage being caused, and a and b are the constants.

The above-described expression (1) reveals the following fact: In the case of FIG. 1, the stress $P_1$ is set up in the whole $\sigma_1$ surface, and therefore the probability $A_1$ is high; that is, the surface damage is caused in a wide range. In the case of FIG. 3, the stress $P_3$ (>Pc) is locally induced in the $\sigma_1$ surface to remove the protrusions of the rough surface by breaking them. Therefore, although the probability $A_3$ is low, the surface damage is caused in a short time. On the other hand, in the case of FIG. 2, the stress $P_2$ is locally established in the $\sigma_1$ surface, and therefore the probability $A_2$ is low; that is, the surface is less damaged.

It is not preferable to make $\sigma_1$ and $\sigma_2$ smaller than 0.15 μmRa, because if they are made so, then the rolling contact surfaces of the mating member and the rolling element must be ground with ultra-high accuracy, which results in an increase in manufacturing cost. If two surfaces smaller than 0.15 μmRa in surface roughness are brought into contact with each other, then the oil film parameter Λ naturally exceeds 1.5. This does not meet the requirement provided by the invention, namely, the boundary lubrication condition.

Concrete Examples

As conducive to a full understanding of the invention, its concrete examples will be described in combination with comparative examples.

Figure 5:
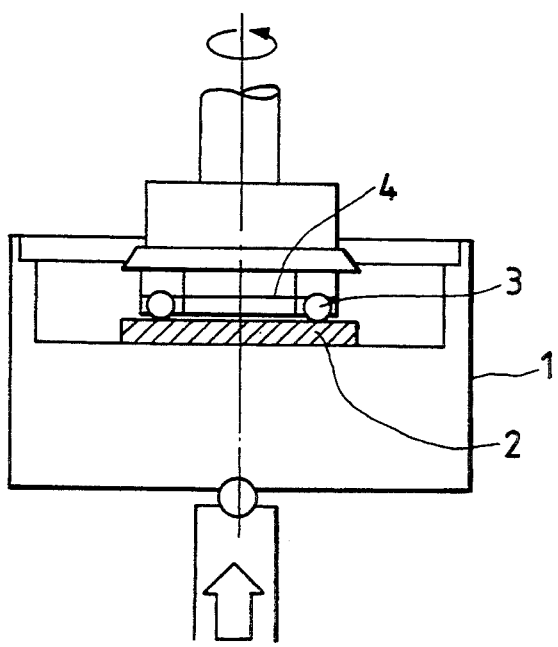
FIG. 5 is an explanatory diagram outlining a thrust type bearing steel ball life tester.

A life test was given to the concrete examples and the comparative examples by using a thrust type bearing steel ball life tester as shown in FIG. 5. The tester is described in the publication "Special Steel Handbook", first edition, edited by Denki Seikoh Kenkyusho, published by Rikougaku-sha, May 25, 1969, pp 10 to 20. In FIG. 5, reference numeral 1 designates a tester body; 2, a disk-shaped material (or mating member) placed on the tester body 1; 3, a steel ball (or rolling element); and 4, a holder.

Figure 6:
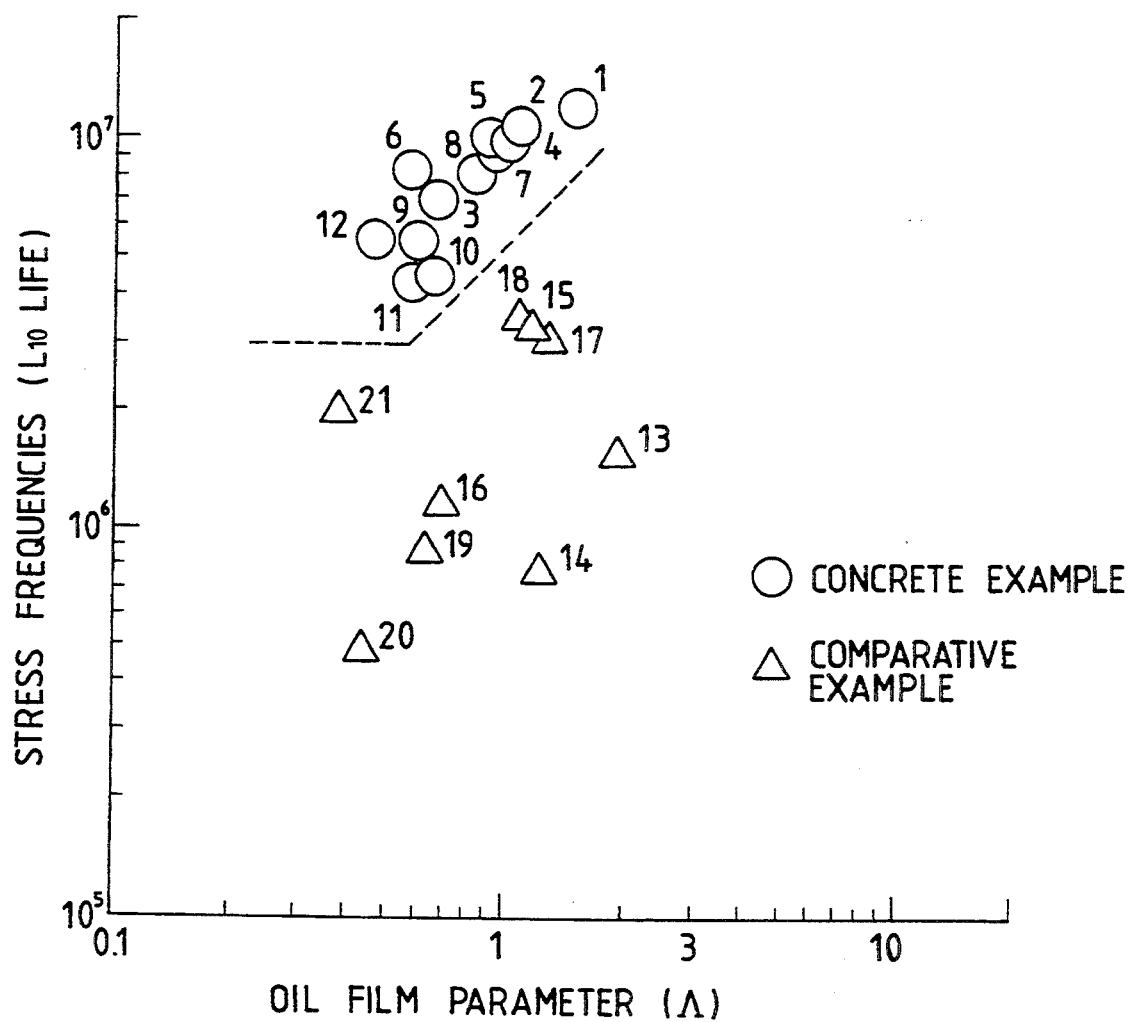
FIG. 6 is a graphical representation indicating the results of a life comparison test.

The test conditions were as follows:
Speed = 1000 rpm
Load stress (maximum) = 500 kgf/mm²
Lubricant = turbine oil Each specimen tested was observed under a microscope or visually, and its life was determined as follows: When the specimen was cracked, flaked or peeled 10%, it was determined that the specimen came to the end of its life ($L_{10}$). And the life was quantitatively represented by the sum of the numbers of revolutions which were detected until the life was determined terminated in the above-described manner. The results of the test are as indicated in Table 1 and FIG. 6. As is apparent from Table 1 and FIG. 6, the concrete examples of the invention are much longer in life than the comparative examples.

In the above-described life test, the rolling element was the steel ball. However, the steel ball may be replaced by a roller. In this case, too, the life is increased.

TABLE 1

| Test No. | Disk-shaped material roughness $\sigma_1$ (μmRa) | Steel ball roughness $\sigma_2$ (μmRa) | Roughness ratio *1 $\sigma_1/\sigma_2$ or $\sigma_2/\sigma_1$ | Oil film parameter | $L_{10}$ Life (×10⁷ cycles) |
|---|---|---|---|---|---|
| Concrete Example | | | | | |
| 1 | 0.15 | 0.17 | 1.13 | 1.43 | 1.13 |
| 2 | 0.15 | 0.26 | 1.73 | 1.08 | 1.07 |
| 3 | 0.15 | 0.45 | 3 | 0.69 | 0.70 |
| 4 | 0.25 | 0.17 | 1.47 | 1.08 | 0.98 |
| 5 | 0.25 | 0.26 | 1.04 | 0.90 | 1.00 |
| 6 | 0.25 | 0.45 | 1.8 | 0.63 | 0.83 |
| 7 | 0.3 | 0.17 | 1.76 | 0.94 | 0.98 *2 |
| 8 | 0.3 | 0.26 | 1.15 | 0.82 | 0.79 |
| 9 | 0.3 | 0.45 | 1.5 | 0.60 | 0.56 |
| 10 | 0.5 | 0.17 | 2.94 | 0.62 | 0.45 *2 |
| 11 | 0.5 | 0.26 | 1.92 | 0.58 | 0.43 *2 |
| 12 | 0.5 | 0.45 | 1.11 | 0.48 | 0.57 |
| Comparative Example | | | | | |
| 13 | 0.025 | 0.17 | 6.8 | 1.89 | 0.16 |
| 14 | 0.025 | 0.26 | 10.4 | 1.24 | 0.08 |
| 15 | 0.1 | 0.26 | 2.6 | 1.17 | 0.34 |
| 16 | 0.1 | 0.45 | 4.5 | 0.71 | 0.12 |
| 17 | 0.25 | 0.05 | 5 | 1.27 | 0.31 *2 |
| 18 | 0.3 | 0.05 | 6 | 1.07 | 0.35 *2 |
| 19 | 0.5 | 0.05 | 10 | 0.65 | 0.09 *2 |
| 20 | 0.7 | 0.26 | 2.69 | 0.44 | 0.05 *2 |
| 21 | 0.7 | 0.45 | 1.56 | 0.29 | 0.21 |

*1 Roughness ratio is $\sigma_1/\sigma_2$ when $\sigma_1/\sigma_2$, and $\sigma_2/\sigma_1$ when $\sigma_2 > \sigma_1$
*2 The $L_{10}$ life of the steel ball represented by the $L_{10}$ life of the disk-shaped material As was described above, in the invention, the central line average roughnesses of the rolling contact surfaces of the rolling elements and the mating members in the rolling bearing which is used in boundary lubrication state are set in a range of 0.15 to 0.5 μmRa, and the ratio of them is set to less than 3. As a result, the surface layers of the contact surfaces of the rolling element and the mating member are lowered in the probability of the surface damage being caused; that is, the occurrence of the peeling damage is suppressed. Therefore, the rolling bearing according to the invention can be formed at low manufacturing cost without the expensive machining operations that the rolling elements and the mating members are ground and polished with ultra-high accuracy, and subjected to special surface treatment.

The foregoing description of preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rolling bearing in which rolling elements rolls on a mating member thereof through oil films formed between said mating member and rolling elements, under the condition that an oil film parameter $\Lambda$ is not more than 1.5, wherein a ratio $\sigma_1/\sigma_2$ or $\sigma_2/\sigma_1$ is not more than 3 where the surface roughnesses $\sigma_1$ and $\sigma_2$ of the rolling contact surfaces of said mating member and each rolling element are represented by central line average roughness.

2. A rolling bearing according to claim 1, wherein the surface roughnesses $\sigma_1$ and $\sigma_2$ of the rolling contact surface of said mating member and each rolling element are in a range of from 0.15 to 0.5 $\mu$mRa.

3. A rolling bearing according to claim 2, wherein $\sigma_2/\sigma_1$ is not more than 3 when $\sigma_2$ is not smaller than $\sigma_1$.

4. A rolling bearing according to claim 1, wherein $\sigma_2/\sigma_1$ is not more than 3 when $\sigma_2$ is not smaller than $\sigma_1$.

* * * * *